(12) United States Patent
Kim

(10) Patent No.: US 9,355,614 B2
(45) Date of Patent: May 31, 2016

(54) IMAGE QUALITY PROCESSING METHOD AND DISPLAY DEVICE USING THE SAME

(71) Applicant: LG Display Co., Ltd., Seoul (KR)

(72) Inventor: Kiltae Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 180 days.

(21) Appl. No.: 13/727,207

(22) Filed: Dec. 26, 2012

(65) Prior Publication Data

US 2013/0300772 A1    Nov. 14, 2013

(30) Foreign Application Priority Data

May 10, 2012 (KR) .......................... 10-2012-0049649

(51) Int. Cl.
*G09G 5/02* (2006.01)
*G06T 11/00* (2006.01)
*G09G 5/12* (2006.01)
*G09G 5/10* (2006.01)

(52) U.S. Cl.
CPC ................ *G09G 5/02* (2013.01); *G06T 11/001* (2013.01); *G09G 5/12* (2013.01); *G09G 5/10* (2013.01); *G09G 2320/02* (2013.01); *G09G 2320/066* (2013.01); *G09G 2340/06* (2013.01); *G09G 2360/16* (2013.01)

(58) Field of Classification Search
CPC ....... G06T 11/001; G06T 15/506; G09G 5/02
USPC .......................................................... 345/589
See application file for complete search history.

(56) References Cited

U.S. PATENT DOCUMENTS

| 4,812,903 A * | 3/1989 | Wagensonner ...... H04N 1/6027 348/645 |
| 6,078,686 A * | 6/2000 | Kim ............................. 382/167 |
| 2004/0096125 A1* | 5/2004 | Alderson et al. .............. 382/312 |
| 2005/0140993 A1* | 6/2005 | Kuwata ......................... 358/1.9 |
| 2006/0192898 A1* | 8/2006 | Mino ............................ 348/672 |
| 2006/0290618 A1* | 12/2006 | Goto ............................. 345/77 |
| 2008/0063295 A1* | 3/2008 | Hasegawa ..................... 382/261 |
| 2010/0134477 A1* | 6/2010 | Kim ............................. 345/214 |

* cited by examiner

*Primary Examiner* — Devona Faulk
*Assistant Examiner* — Hai Tao Sun
(74) *Attorney, Agent, or Firm* — Fenwick & West LLP

(57) ABSTRACT

This embodiment herein relates to an image quality processing method and a display device using the same which decrease a hardware processing load of the display device and improve both a contrast ratio and sharpness of edges in an image.

9 Claims, 8 Drawing Sheets

FIG. 4A

| RGB (1, 1) | RGB (1, 2) | RGB (1, 3) | RGB (1, 4) | . . . | RGB (1, n) |
|---|---|---|---|---|---|
| RGB (2, 1) | RGB (2, 2) | RGB (2, 3) | RGB (2, 4) | . . . | RGB (2, n) |
| RGB (3, 1) | RGB (3, 2) | RGB (3, 3) | RGB (3, 4) | . . . | RGB (3, n) |
| RGB (4, 1) | RGB (4, 2) | RGB (4, 3) | RGB (4, 4) | . . . | RGB (4, n) |
| ⋮ | ⋮ | ⋮ | ⋮ | ⋮ | . . . |
| RGB (m, 1) | RGB (m, 2) | RGB (m, 3) | RGB (m, 4) | . . . | RGB (m, n) |

IMAGE QUALITY PROCESSING METHOD AND DISPLAY DEVICE USING THE SAME

CROSS-REFERENCE TO RELATED APPLICATION

This application claims priority to Republic of Korean Patent Application No. 10-2012-0049649, filed on May 10, 2012, which is incorporated herein by reference in its entirety.

BACKGROUND

1. Technical Field

The following description relates to an image quality processing method and a display device using the same which improves a contrast ratio and expresses edges in an image more sharply at the same time.

2. Discussion of the Related Art

There has been an increasing demand for a display device for displaying an image together with the growth of an information-oriented society. Recently, various flat panel displays which reduce weight and volume corresponding to an advantage of a cathode ray tube are developed. For example, the various flat panel displays such as liquid crystal displays (LCDs), plasma display panels (PDPs), and organic light emitting diodes (OLEDs) have been widely used in recent years.

The display device improves an image quality by using various image quality processing methods. Especially, a method for improving a contrast ratio and a method for improving sharpness of edges are commonly used as the image quality processing methods. The edges refer to an outline of objects in the image. Two of the methods for improving the contrast ratio and the method for improving sharpness of the edges should be applied to the display device in order to improve both the contrast ratio and sharpness of the edges in the image. In this case, the display device includes two image quality processors, a first image quality processor for improving the contrast ratio and a second image quality processor for improving sharpness of the edges. Therefore, a hardware processing load of the display device is increased, and it causes a fabrication cost of the display device to rise.

SUMMARY

One object of the embodiments of this application provides an image quality processing method and a display device using the same which decrease a hardware processing load of the display device and improve both a contrast ratio and sharpness of edges in an image.

To achieve these objects and other advantages and in accordance with the purpose according to one aspect of the invention, an image quality processing method comprises: generating high luminance data by multiplying luminance data by a first value, generating low luminance data by multiplying the luminance data by a second value, converting the luminance data, the high luminance data, and the low luminance data into blurred luminance data, blurred high luminance data, and blurred luminance data by a blur processing operation with a mask, generating conversion luminance data based on a first difference between the blurred high luminance data and the blurred luminance data, and second a difference between the blurred luminance data and the blurred low luminance data.

In another aspect, a display device comprises: a display panel configured to include data lines, gate lines, and a plurality of pixels; an image quality processor configured to convert digital video data into conversion digital video data; a data driving circuit configured to convert conversion digital video data into analog data voltages, and supply the data voltages to the data lines; and a gate driving circuit configured to sequentially supply a gate signal to the gate lines, wherein the image quality processor including: a luminance data generator configured to generate high luminance data by multiplying luminance data by a first value, and low luminance data by multiplying the luminance data by a second value; a mask operator configured to convert the luminance data, the high luminance data, and the low luminance data into blurred luminance data, blurred high luminance data, and blurred luminance data by a blur processing operation with a mask, a conversion luminance data generator configured to generate conversion luminance data based on a first difference between the blurred high luminance data and the blurred luminance data, and a second difference between the blurred luminance data and the blurred low luminance data.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 4A illustrates an example of data arrangement of input digital video data;

DETAILED DESCRIPTION

Figure 1:
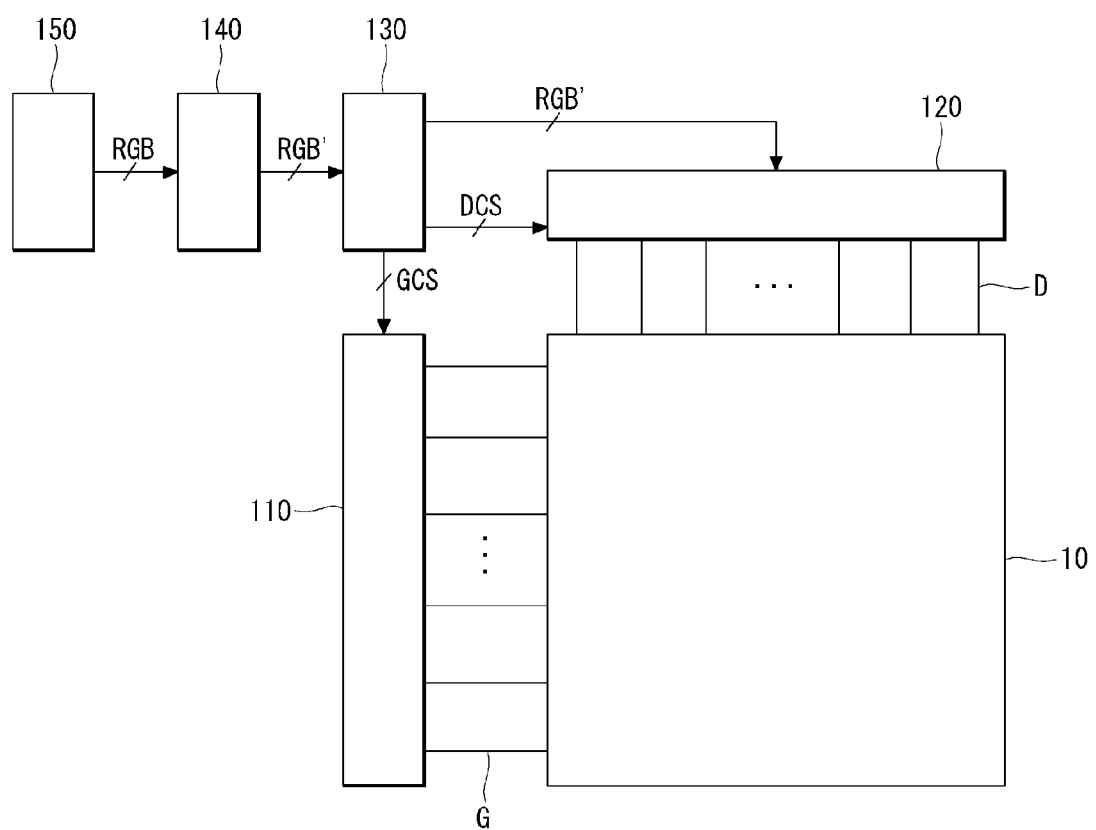
FIG. 1 illustrates a block diagram schematically showing a display device according to an exemplary embodiment.

The invention will be described more fully hereinafter with reference to the accompanying drawings, in which example embodiments are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

FIG. 1 illustrates a block diagram schematically showing a display device according to an exemplary embodiment. Referring to FIG. 1, the display device according to the exemplary embodiment comprises a display panel 10, a gate driving circuit 110, a data driving circuit 120, a timing controller 130, an image quality processor 140, and a host system 150. The display device according to the example embodiment may be implemented as a flat panel display such as a liquid crystal display (LCD), a field emission display (FED), a plasma display panel (PDP), or an organic light emitting diode (OLED) display. In the following description, the example embodiment describes the liquid crystal display as an example of the display device. Other kinds of flat panel displays may be used.

The example liquid crystal display panel 10 may include a thin film transistor (TFT) substrate (not shown) and a color filter substrate (not shown). A liquid crystal layer (not shown) may be formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G receives a data voltage supplied via the data line D. In turn, the TFT applies the voltage to a pixel electrode of a corresponding liquid crystal cell in response to a gate pulse supplied through the gate line G. A common voltage may be supplied to a common electrode. Each of the pixels is driven by an electric field between the pixel electrode and the common electrode.

A color filter array (not shown), including a black matrix and a color filter, may be formed on the color filter substrate. The common electrode may be formed on the color filter substrate in a vertical electric field driving manner, such as a twisted nematic (TN) mode and a vertical alignment (VA) mode. The common electrode may be formed on the TFT substrate along with the pixel electrode in a horizontal electric field driving manner, such as in an in-plane switching (IPS) mode and/or a fringe field switching (FFS) mode. The display panel 10 may be implemented in any liquid crystal mode such as the TN, VA, IPS, and FFS modes.

Additionally, an upper polarizing plate (not shown) may be disposed on the color filter substrate and a lower polarizing plate (not shown) may be disposed on the TFT substrate. Alignment layers (not shown) for setting pre-tilt angles of liquid crystals may be respectively formed on the TFT substrate and the color filter substrate. Also, a spacer (not shown) may be formed between the TFT substrate and the color filter substrate to maintain a cell gap of the liquid crystal layer.

The display panel 10 may be implemented as a transmissive type liquid crystal panel which modulates light from a backlight unit (not shown). The backlight unit may include one or more light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

The data driving circuit 120 comprises a plurality of source drive ICs. The source drive ICs receive conversion digital video data RGB' from the timing controller 130. The source drive ICs convert the digital video data RGB' into gamma correction voltages to generate data voltages, in response to data timing control signals DCS from the timing controller 130. And then, the source drive ICs supply the data voltages to the data lines D of the display panel 10 in synchronization with the gate signal from the gate driving circuit 110.

The gate driving circuit 110 sequentially supplies the gate signal to the gate lines G in response to gate timing control signals GCS from the timing controller 130. The gate driving circuit 110 includes a shift register, a level shifter which level-shifts output signal of the shift register to a voltage having a swing width for driving the TFT of each pixel, and an output buffer.

The timing controller 130 receives the conversion digital video data RGB' and timing signals from the image quality processor 140. The timing signals include a vertical synchronization signal, a horizontal synchronization signal, a data enable signal, a clock signal, and so forth. The timing controller 130 transmits the digital video data RGB input from the host system 150 to the data driving circuit 120. The timing controller 130 generates timing control signals for controlling operation timings of the data driving circuit 120 and the gate driving circuit 110 based on the timing signals. The timing control signals comprise the gate timing control signals GCS for controlling operation timings of the gate driving circuit 110, and the data timing signals DCS for controlling operation timings of the data driving circuit 120.

The host system 150 includes a system on chip having a scaler therein and converts digital video data RGB input from an external video source device to a data format of a resolution appropriate for displaying in the display panel 10. The host system 150 transmits the digital video data RGB and timing signals to the image quality processor 140 via an interface such as an LVDS (low voltage differential signaling) interface, a TMDS (transition minimized differential signaling) interface or the like.

The image quality processor 140 converts the digital video data RGB from the host system 150 into the conversion digital video data RGB' for improving both a contrast ratio and sharpness of edges in an image at the same time. The edges refer to an outline of objects in the image. Hereinafter, an image quality processing method of the image quality processor 140 will be described in detail with reference to FIGS. 2 and 3.

Figure 2:
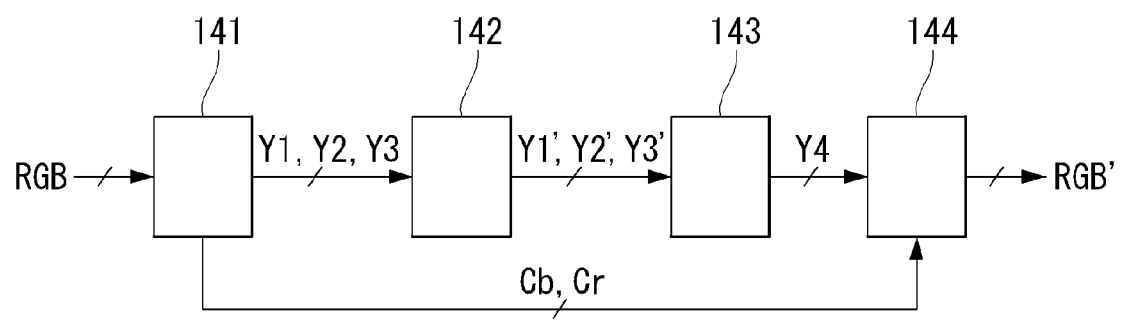
FIG. 2 illustrates an example of an image quality processor shown in FIG. 1.
Figure 3:
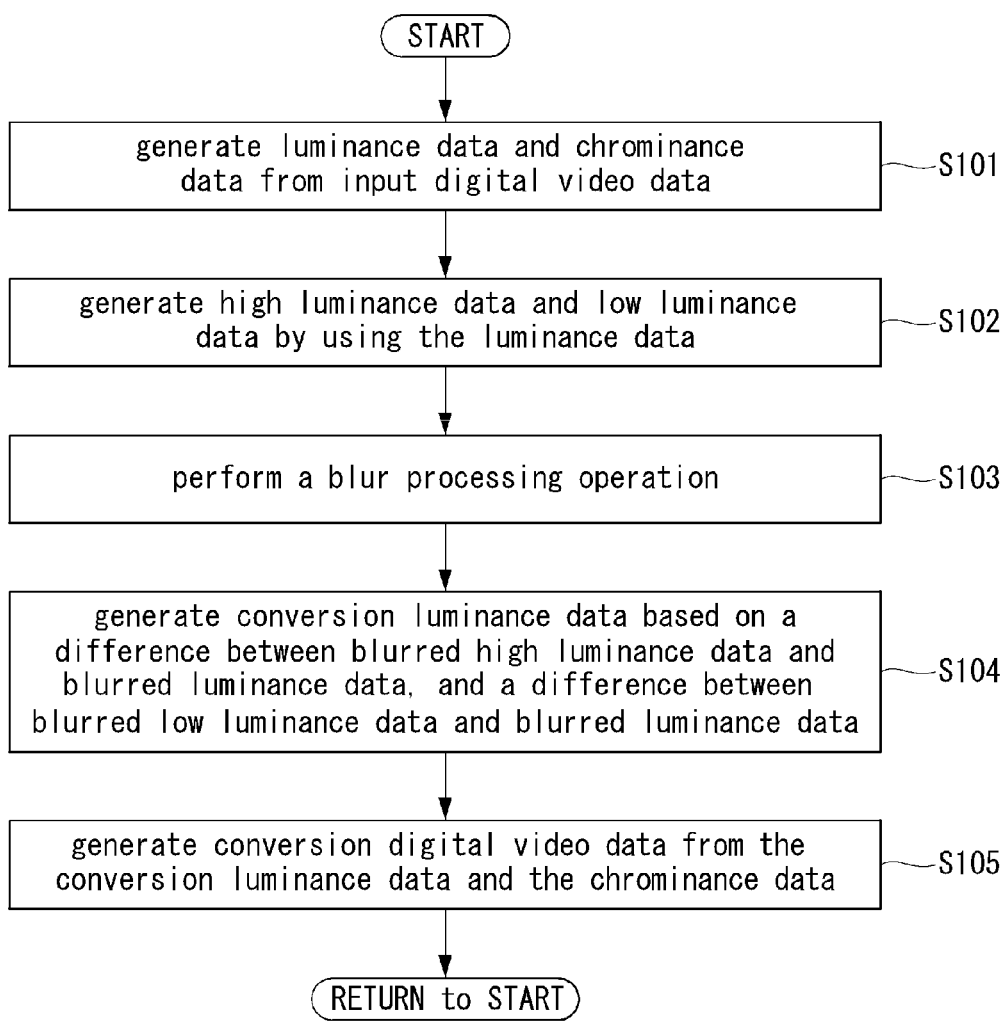
FIG. 3 illustrates an example of an image quality processing method.

FIG. 2 illustrates an example of an image quality processor 140 shown in FIG. 1. FIG. 3 illustrates an example of an image quality processing method. Referring to FIGS. 2 and 3, the image quality processor 140 may include a luminance data generator 141, a mask operator 142, a conversion luminance data generator 143, and a conversion digital video data generator 144.

The luminance data generator 141 performs a first step S101 and a second step S102. The luminance data generator 141 receives the digital video data RGB from the host system 150. FIG. 4A illustrates an example of data arrangement of input digital video data. Referring to FIG. 4A, the digital video data RGB during one frame period include m digital video data toward a horizontal direction (x-axis direction), and n digital video data toward a vertical direction (y-axis direction), wherein m and n are a natural number. m indicates a horizontal resolution of the display panel, and n indicates a vertical resolution of the display panel. That is, the digital video data RGB during one frame period include m×n digital video data. Meanwhile, the digital video data RGB during one frame period may be expressed by a Cartesian coordinate. For example, the digital video data RGB during one frame period may include the digital video data RGB(1,1)~RGB(m, n) at a coordinate (1,1) to (m,n) as shown in FIG. 4A. Also, in the exemplary embodiment, the digital video data RGB includes red digital data R, green digital data G, and blue digital data B, however the exemplary embodiment is not limited thereto.

The luminance data generator 141 generates luminance data Y1 and chrominance data Cb, Cr from the digital video data RGB. In one embodiment, the luminance data generator 141 generates luminance data Y1(j,k) chrominance data Cb(j, k), Cr(j,k) at a coordinate (j,k) from digital video data RGB (j,k) at the coordinate (j,k) as shown in following equations 1 to 3, wherein j is a natural number equal to or greater than 1 and equal to or less than m, and k is a natural number equal to or greater than 1 and equal to or less than n.

$$Y1(j,k)=0.299R(j,k)+0.589G(j,k)+0.114B(j,k) \quad (1)$$

$$Cb(j,k) = -0.1687R(j,k) - 0.3313G(j,k) + 0.5B(j,k) + 128 \quad (2)$$

$$Cr(j,k) = 0.5R(j,k) - 0.4187G(j,k) - 0.0813B(j,k) + 128 \quad (3)$$

In equations 1 to 3, Y1(j,k) indicates the luminance data at the coordinate (j,k). Cb(j,k) and Cr(j,k) indicate the chrominance data at the coordinate (j,k). R(j,k) indicates red digital data at the coordinate (j,k). G(j,k) indicates green digital data at the coordinate (j,k). B(j,k) indicates blue digital data at the coordinate (j,k). Meanwhile, when the digital video data RGB is 8 bits data, the luminance data Y1 and the chrominance data Cb, Cr are 8 bits data. (see S101 in FIG. 3)

Figure 4B:
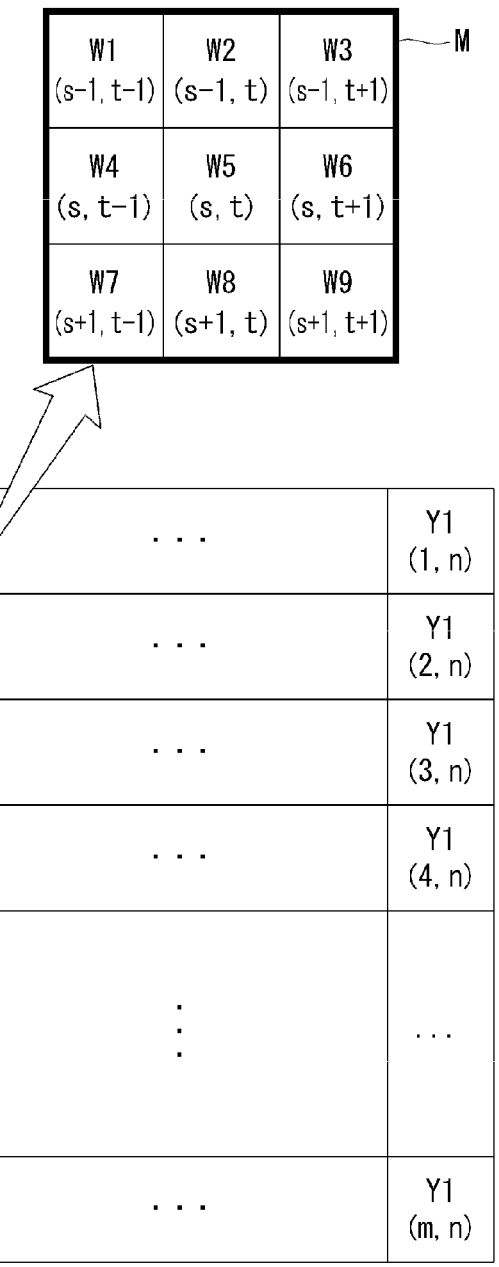
FIG. 4B illustrates an example of data arrangement of luminance data.

The luminance data generator 141 generates high luminance data Y2 and low luminance data Y3 from the luminance data Y1. FIG. 4B illustrates an example of data arrangement of luminance data. Referring to FIG. 4B, the luminance data Y1 during one frame period include m luminance data toward the horizontal direction (x-axis direction), and n luminance data toward a vertical direction (y-axis direction). That is, the luminance data Y1 during one frame period include m×n luminance data. Also, the luminance data Y1 during one frame period may be expressed by the Cartesian coordinate.

The luminance data generator 141 generates the high luminance data by multiplying the luminance data by a first value, and the low luminance data by multiplying the luminance data by a second value. More specifically, the luminance data generator 141 generates high luminance data Y2(j,k) at the coordinate (j,k) by multiplying the luminance data Y1(j,k) at the coordinate (j,k) by the first value. Also, the luminance data generator 141 generates low luminance data Y3(j,k) at the coordinate (j,k) by multiplying the luminance data Y1(j,k) at the coordinate (j,k) by the second value.

$$Y2(j,k) = Y1(j,k) \times V1 \quad (4)$$

$$Y3(j,k) = Y1(j,k) \times V2 \quad (5)$$

In equations 4 and 5, Y1(j,k) indicates the luminance data at the coordinate (j,k). Y2(j,k) indicates the high luminance data at the coordinate (j,k). Y3(j,k) indicates the low luminance data at the coordinate (j,k). V1 indicates the first value, and V2 indicates the second value. The first value V1 may be greater than 1 and less than 2, and the second value V2 may be greater than 0 and less than 1. Hence, the high luminance data Y2 may be greater than the luminance data Y1, and the low luminance data Y3 may be less than the luminance data Y1.

The luminance data generator 141 outputs the luminance data Y1, the high luminance data Y2, and the low luminance data Y3 to the mask operator 142. Also, the luminance data generator 141 outputs the chrominance data Cb, Cr to the conversion digital video data generator. (see S102 in FIG. 3)

Figure 4C:
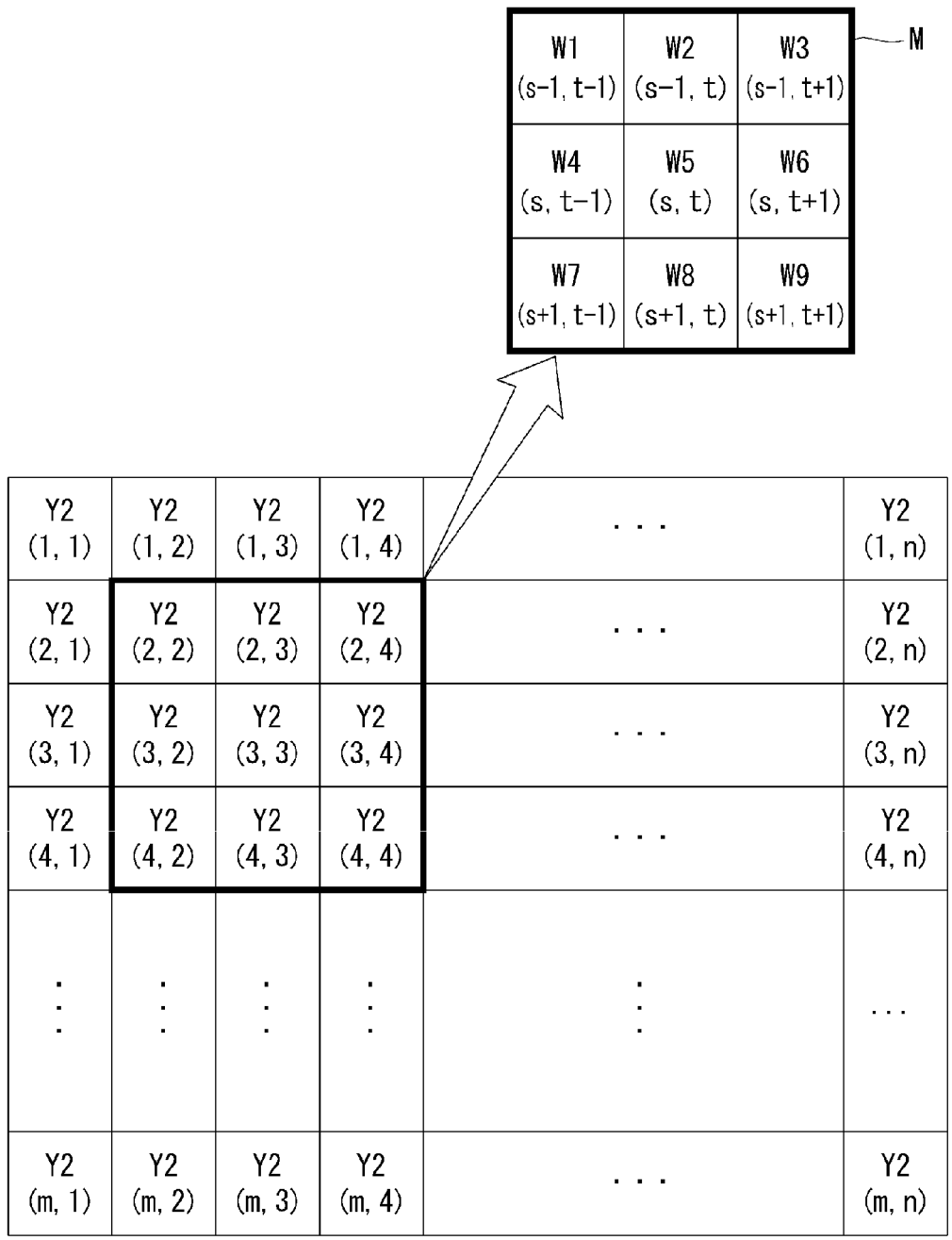
FIG. 4C illustrates an example of data arrangement of high luminance data.
Figure 4D:
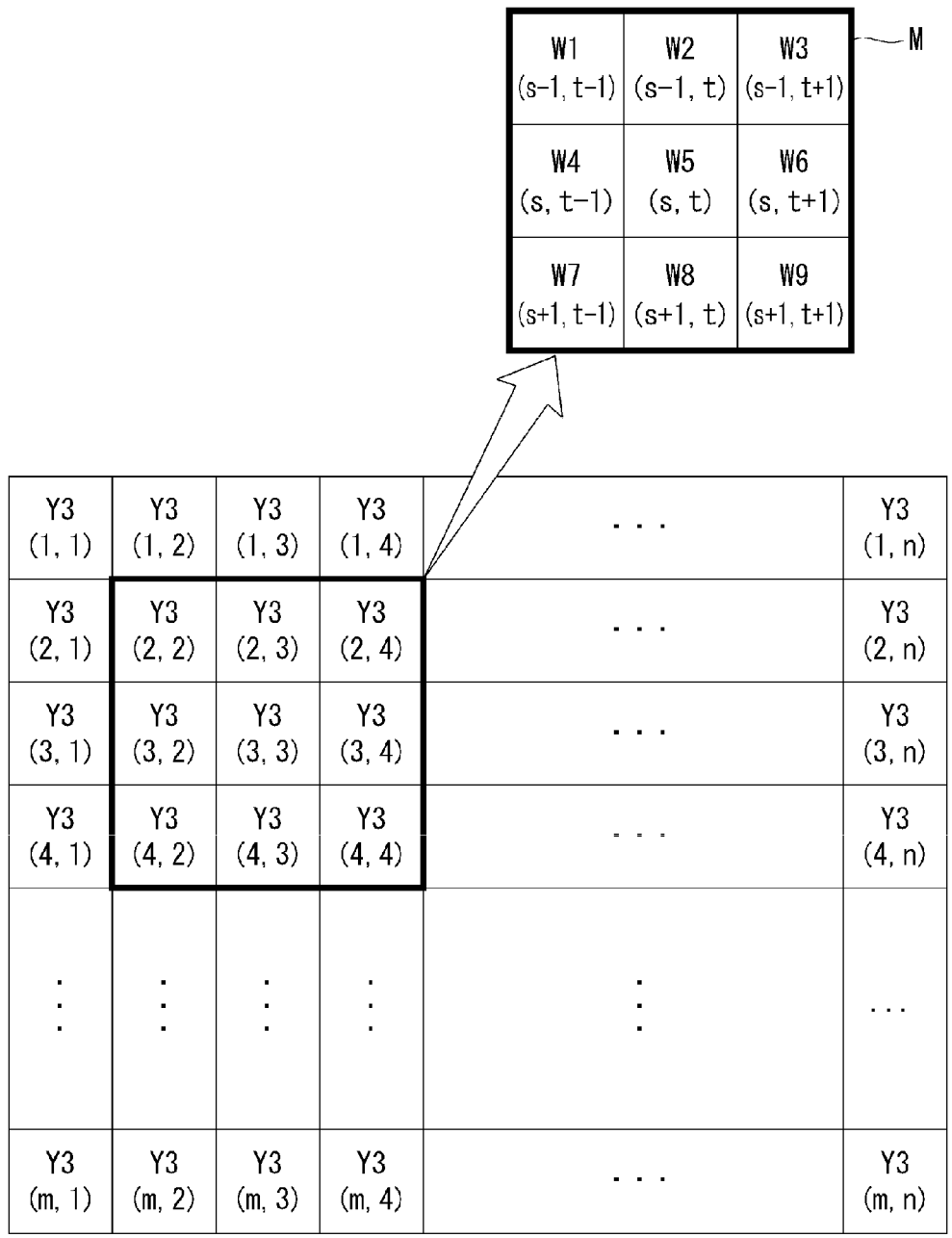
FIG. 4D illustrates an example of data arrangement of low luminance data.

The mask operator 142 receives the luminance data Y1, the high luminance data Y2, and the low luminance data Y3 from the luminance data generator 141. The mask operator 142 performs a blur processing operation with a mask to the luminance data Y1, the high luminance data Y2, and the low luminance data Y3. FIG. 4C illustrates an example of data arrangement of high luminance data. Referring to FIG. 4C, the high luminance data Y2 during one frame period include m high luminance data toward the horizontal direction (x-axis direction), and n high luminance data toward a vertical direction (y-axis direction). That is, the high luminance data Y2 during one frame period include m×n high luminance data. FIG. 4D illustrates an example of data arrangement of low luminance data. Referring to FIG. 4D, the low luminance data Y3 during one frame period include m low luminance data toward the horizontal direction (x-axis direction), and n low luminance data toward a vertical direction (y-axis direction). That is, the low luminance data Y3 during one frame period include m×n low luminance data. Also, both the high luminance data Y2 and the low luminance data Y3 during one frame period may be expressed by the Cartesian coordinate.

The mask operator 142 converts the luminance data Y1, the high luminance data Y2, and the low luminance data Y3 into blurred luminance data Y1', blurred high luminance data Y2', and blurred luminance data Y3' by the blur processing operation with the mask. The blur processing operation makes the image blurred. More specifically, the mask operator 142 sets a p×q mask M on each of the luminance data Y1, the high luminance data Y2, and the low luminance data Y3 as shown in FIGS. 4B, 4C, and 4D, respectively. And then, the mask operator 142 converts the luminance data Y1, the high luminance data Y2, and the low luminance data Y3 into blurred luminance data Y1', blurred high luminance data Y2', and blurred luminance data Y3' through a mask operation with the p×q mask M. In FIGS. 4B, 4C, and 4D, the p×q mask is a 3×3 mask M, however is not limited thereto.

The p×q mask may be set to a weight-matrix. That is, weight values are set in accordance with a position of the p×q mask M. The mask operator 142 may multiply the luminance data Y1 on the p×q mask by the weight values of the p×q mask M. And then, the mask operator 142 may calculate an average of the luminance data Y1 multiplied by the weight values on the p×q mask. And then, the mask operator 142 may replace the blurred luminance data Y1' corresponding to a central position of the p×q mask with the average.

More specifically, the mask operator 142 may multiply the luminance data Y1 on the 3×3 mask M by the weight values W1 to W9 of the 3×3 mask M as shown in FIG. 4B. In FIG. 4B, the 3×3 mask M is set on the luminance data Y1 at a coordinate (2,2) to a coordinate (4,4). In FIG. 4B, a position (s,t) of the 3×3 mask M may be the central position, wherein s and t are natural numbers greater than 2. For example, the mask operator 142 may multiply the luminance data Y1(2,2) at the coordinate (2,2) by the first weight value W1 at a position (s−1,t−1) of the 3×3 mask M. Also, the mask operator 142 may multiply the luminance data Y1(2,3) at the coordinate (2,3) by the second weight value W2 at a position (s−1,t) of the 3×3 mask M. Similarly, the mask operator 142 may multiply the luminance data Y1(2,4), Y1(3,2), Y1(3,3), Y1(3,4), Y1(4,2), Y1(4,3), and Y1(4,4) by W3, W4, W5, W6, W7, W8 and W9 at positions (s−1,t+1), (s,t−1), (s,t), (s,t+1), (s+1,t−1), (s+1,t) and (s+1,t+1) of the 3×3 mask M, respectively. And then, the mask operator 142 may calculate the average of the luminance data Y1 multiplied by the weight values W1 to W9 on the 3×3 mask M. And then, the mask operator 142 may replace the blurred luminance data Y1'(3,3) at a coordinate (3,3) corresponding to the central position (s,t) of the 3×3 mask M with the average. Therefore, the luminance data Y1(3,3) at the coordinate (3,3) is converted into the blurred luminance data Y1'(3,3) at the coordinate (3,3) through the blur processing operation of the mask operator 142. The blur processing operation of the mask operator 142 in FIG. 4B may be expressed as equation 6.

$$Y1'(x,y) = [W1 \times Y1(x-1,y-1) + W2 \times Y1(x-1,y) + W3 \times Y1(x-1,y+1) + W4 \times Y1(x,y-1) + W5 \times Y1(x,y) + W6 \times Y1(x,y+1) + W7 \times Y1(x+1,y-1) + W8 \times Y1(x+1,y) + W9 \times Y1(x+1,y+1)] \times \tfrac{1}{9} \quad (6)$$

In equation 6, Y1'(x,y) indicates the blurred luminance data at a coordinate (x,y), wherein x, y is a natural number greater than 2. Y1(x,y) indicates the luminance data at the coordinate (x,y). W1 to W9 indicate the first to nine weight values in accordance with the position of the 3×3 mask M.

Also, the mask operator 142 performs the blur processing operation of the luminance data Y1(1,1)~Y(m,n) at the coordinate (1,1) to (m,n) by shifting the p×q mask on the basis of the central position of the p×q mask. Therefore, the luminance data Y1(1,1)~Y(m,n) at the coordinates (1,1) to (m,n) may be converted into the blurred luminance data Y1'(1,1) ~Y'(m,n) at the coordinates (1,1) to (m,n). For example, the mask operator 142 converts the luminance data Y1(3,4) at a coordinate (3,4) into the blurred luminance data Y1'(3,4) at the coordinate (3,4) by shifting the 3×3 mask M after converting the luminance data Y1(3,3) at the coordinate (3,3) into the blurred luminance data Y1(3,3) at the coordinate (3,3).

Meanwhile, the mask operator 142 converts the high luminance data Y2 into the blurred high luminance data Y2' and the low luminance data Y3 into the blurred low luminance data Y3' by the blur processing method. The blur processing method for the blurred high luminance data Y2' and the blurred low luminance data Y3' may be same as the blur processing method for the blurred luminance data Y1' and is omitted. (see S103 in FIG. 3)

The conversion luminance data generator 143 receives the blurred luminance data Y1', the blurred high luminance data Y2', and the blurred low luminance data Y3' from the mask operator 142. The blurred luminance data Y1' during one frame period includes m×n blurred luminance data. That is, blurred luminance data Y1' during one frame period includes the blurred luminance data Y1'(1,1)~Y1'(m,n) at the coordinate (1,1) to (m,n). The blurred high luminance data Y2' during one frame period includes the blurred high luminance data. That is, blurred high luminance data Y2' during one frame period includes the blurred high luminance data Y2'(1,1)~Y2'(m,n) at the coordinate (1,1) to (m,n). The blurred low luminance data Y3' during one frame period includes m×n blurred low luminance data. That is, blurred low luminance data Y3' during one frame period includes the blurred low luminance data Y3'(1,1)~Y3'(m,n) at the coordinate (1,1) to (m,n).

Figure 5:
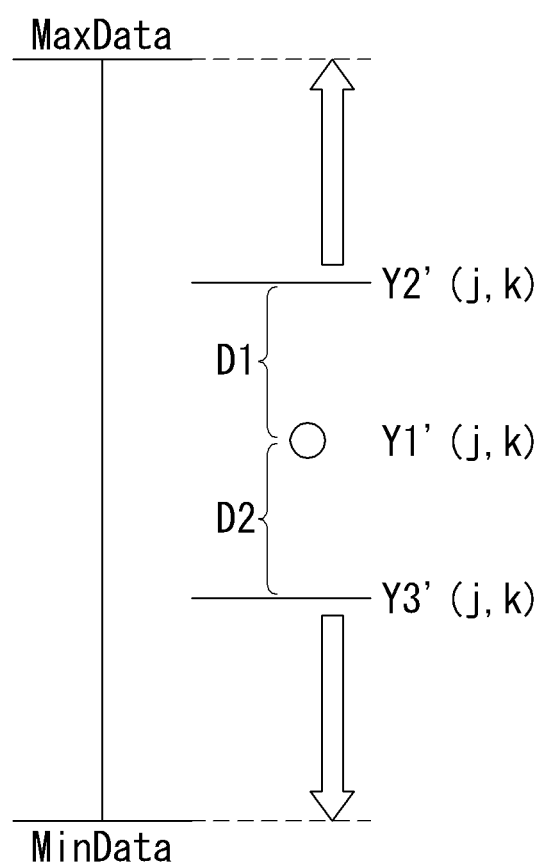
FIG. 5 illustrates an example of data generation method a conversion luminance data generator.

FIG. 5 illustrates an example data generation method of the conversion luminance data generator 143. Referring to FIG. 5, the conversion luminance data generator 143 generates conversion luminance data Y4 based on a difference D1 between the blurred high luminance data Y2' and the blurred luminance data Y1', and a difference D2 between the blurred luminance data and the blurred low luminance data Y3'. More specifically, the conversion luminance data generator 143 generates the conversion luminance data Y4(j,k) at a coordinate (j,k) based on a difference D1 between the blurred high luminance data Y2'(j,k) at the coordinate (j,k) and the blurred luminance data Y1'(j,k) at the coordinate (j,k), and a difference D2 between the blurred luminance data Y1'(j,k) at the coordinate (j,k) and the blurred low luminance data Y3'(j,k) as shown in equation 7, wherein j, k is a natural number.

$$Y4(j,k) = MaxData \times \frac{D2}{D1+D2} \quad (7)$$

In equation 7, Y4(j,k) indicates the conversion luminance data at the coordinate (j,k). D1 indicates a difference between the blurred high luminance data Y2'(j,k) at the coordinate (j,k) and the blurred luminance data Y1'(j,k) at the coordinate (j,k). D2 indicates a difference between the blurred luminance data Y1'(j,k) at the coordinate (j,k) and the blurred low luminance data Y3'(j,k). MaxData indicates a maximum value of the conversion luminance data Y4. MinData indicates a minimum value of the conversion luminance data Y4. For example, when the conversion luminance data may be 8 bits data, MaxData may be "255", and MinData may be "0".

When D1 is greater than D2, the conversion luminance data Y4(j,k) at the coordinate (j,k) has a value which is closer to MaxData than MinData. When D2 is greater than D1, the conversion luminance data Y4(j,k) at the coordinate (j,k) has a value which is closer to MinData than MaxData.

As described above, the conversion luminance data generator 143 improves a gray level banding by generating the conversion luminance data Y4 in proportion to a difference D1 between the blurred high luminance data Y2' and the blurred luminance data Y1', and a difference D2 between the blurred luminance data Y1' and the blurred low difference data Y2'. The gray level banding indicates that values of the conversion luminance data Y4 during one frame are gathered around a specific value. The conversion luminance data generator 143 outputs the conversion luminance data Y4 to the conversion digital video data generator 144. (see S104 in FIG. 3)

The conversion digital video data generator 144 receives the conversion luminance data Y4 from the conversion luminance generator 143, and the chrominance data Cb, Cr from the luminance generator 141. The conversion luminance data Y4 during one frame period includes m×n conversion luminance data. That is, the conversion luminance data Y4 during one frame period includes the conversion luminance data Y4(1,1)~Y4(m,n) at the coordinates (1,1) to (m,n). Also, the chrominance data Cb, Cr during one frame period includes m×n chrominance data. That is, the chrominance data Cb, Cr during one frame period includes the chrominance data Cb(1,1)~Cb(m,n), Cr(1,1)~Cr(m,n) at the coordinates (1,1) to (m,n).

The conversion digital video data generator 144 generates the conversion digital video data RGB' from the conversion luminance data Y4 and the chrominance data Cb, Cr. The conversion digital video data generator 144 generates the conversion digital video data RGB'(j,k) at the coordinate (j,k) from the conversion luminance data Y4(j,k) at the coordinate (j,k) and the chrominance data Cb(j,k), Cr(j,k) at the coordinate (j,k) as shown in following equations 8 to 10.

$$R'(j,k) = Y4(j,k) + 1.402Cr(j,k) \quad (8)$$

$$G'(j,k) = Y4(j,k) - 0.334Cb(j,k) - 0.713Cr(j,k) \quad (9)$$

$$B'(j,k) = Y4(j,k) + 1.772Cb(j,k) \quad (10)$$

In equations 8 to 10, Y4(j,k) indicates the conversion luminance data at the coordinate (j,k). Cb(j,k) and Cr(j,k) indicate the chrominance data at the coordinate (j,k). R'(j,k) indicates red conversion digital data at the coordinate (j,k). G'(j,k) indicates green conversion digital data at the coordinate (j,k). B'(j,k) indicates blue conversion digital data at the coordinate (j,k). The conversion digital video data RGB' includes the red conversion digital data R', the green conversion digital data G', and the blue conversion digital data B'. The digital video data converter 144 outputs the conversion digital data RGB' to the timing controller 130. (see S105 in FIG. 3)

The embodiments described herein improve both a contrast ratio and sharpness of edges in an image at the same time. Accordingly, the embodiments described herein decrease a hardware processing load of the display device. Also, the embodiments described herein generate the conversion luminance data in proportion to a difference between the blurred high luminance data and the blurred luminance data, and a difference between the blurred luminance data and the blurred low difference data. Therefore, the embodiments described herein improve gray level banding.

Although the embodiments of this application have been described with reference to a number of illustrative embodiments thereof, it should be understood that numerous other modifications and embodiments of this application can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image quality processing method comprising:
receiving luminance data of pixels of an image, each pixel disposed at a corresponding coordinate;
generating high luminance data at a coordinate (j,k) by multiplying the luminance data at the coordinate (j,k) by a first value;
generating low luminance data at the coordinate (j,k) by multiplying the luminance data at the coordinate (j,k) by a second value;
converting the luminance data, the high luminance data, and the low luminance data at the coordinate (j,k), into blurred luminance data, blurred high luminance data, and blurred low luminance data at the coordinate (j,k), respectively, by blur processing operations with a mask;
generating conversion luminance data at the coordinate (j,k) based on a first difference between the blurred high luminance data at the coordinate (j,k) and the blurred luminance data at the coordinate (j,k), and a second difference between the blurred luminance data at the coordinate (j,k) and the blurred low luminance data at the coordinate (j,k); and
outputting the generated conversion luminance data to a display panel,
wherein generating the conversion luminance data comprises:
generating the conversion luminance data at the coordinate (j,k) by using an equation $$Y4(j, k) = MaxData \times \frac{D2}{D1 + D2},$$

where Y4(j,k) is the conversion luminance data at the coordinate (j,k), D1 is the first difference between the blurred high luminance data at the coordinate (j,k) and the blurred luminance data at the coordinate (j,k), D2 is the second difference between the blurred luminance data at the coordinate (j,k) and the blurred low luminance data at the coordinate (j,k), and MaxData is a maximum value of the conversion luminance data.

2. The image quality processing method of claim 1, wherein the first value is greater than 1 and less than 2, and the second value is greater than 0 and less than 1.

3. The image quality processing method of claim 1, wherein converting the luminance data into the blurred luminance data comprises:
multiplying the luminance data of the pixels on a p×q mask by weight values of the p×q mask, wherein p and q are natural numbers greater than 2;
calculating an average of the luminance data of the pixels on the p×q mask multiplied by the weight values;
replacing the blurred luminance data of a pixel of a central position of the p×q mask with the average, the pixel of the central position of the p×q mask corresponding to the coordinate (j,k); and
shifting the p×q mask on a basis of the central position of the p×q mask,
wherein the weight values are set in accordance with a position of the p×q mask.

4. The image quality processing method of claim further comprising:
generating the luminance data and chrominance data from input digital video data; and
generating conversion digital video data from the conversion luminance data and the chrominance data.

5. A display device comprising:
a display panel including data lines, gate lines, and a plurality of pixels;
an image quality processor configured to convert digital video data into conversion digital video data;
a data driving circuit configured to convert conversion digital video data into analog data voltages, and supply the analog data voltages to the data lines; and
a gate driving circuit configured to sequentially supply a gate signal to the gate lines,
wherein the image quality processor comprises:
a luminance data generator configured to:
receive luminance data of pixels of an image, each pixel disposed at a corresponding coordinate,
generate high luminance data at a coordinate (j,k) by multiplying the luminance data at the coordinate (j,k) by a first value, and
generate low luminance data at the coordinate (j,k) by multiplying the luminance data at the coordinate (j,k) by a second value,
a mask operator configured to convert the luminance data, the high luminance data, and the low luminance data at the coordinate (j,k), into blurred luminance data, blurred high luminance data, and blurred low luminance data at the coordinate (j,k), respectively, by blur processing operations with a mask, and
a conversion luminance data generator configured to generate conversion luminance data at the coordinate (j,k) based on a first difference between the blurred high luminance data at the coordinate (j,k) and the blurred luminance data at the coordinate (j,k), and a second difference between the blurred luminance data at the coordinate (j,k) and the blurred low luminance data at the coordinate (j,k),
wherein the conversion luminance data generator generates the conversion luminance data at the coordinate (j,k) by using an equation $$Y4(j, k) = MaxData \times \frac{D2}{D1 + D2},$$

where Y4(j,k) is the conversion luminance data at the coordinate (j,k), D1 is the first difference between the blurred high luminance data at the coordinate (j,k) and the blurred luminance data at the coordinate (j,k), D2 is the second difference between the blurred luminance data at the coordinate (j,k) and the blurred low luminance data at the coordinate (j,k), and MaxData is a maximum value of the conversion luminance data.

6. The display device of claim 5, wherein the first value is greater than 1 and less than 2, and the second value is greater than 0 and less than 1.

7. The display device of claim 5, wherein the mask operator is configured to:

multiply the luminance data of the pixels on a p×q mask by weight values of the p×q mask, wherein p and q are natural numbers greater than 2;

calculate an average of the luminance data of the pixels on the p×q mask multiplied by the weight values;

replace the blurred luminance data of a pixel of a central position of the p×q mask with the average, the pixel of the central position of the p×q mask corresponding to the coordinate (j,k); and shift the p×q mask on a basis of the central position of the p×q mask, wherein the weight values are set in accordance with a position of the p×q mask.

8. The display device of claim 5, wherein the luminance data generator generates the luminance data and chrominance data from input digital video data.

9. The display device of claim 5, further comprising:

a conversion digital video data generator configured to generate the conversion digital video data from the conversion luminance data and chrominance data.

* * * * *